No. 635,472. Patented Oct. 24, 1899.
C. P. GOERZ & E. VON HÖEGH.
PHOTOGRAPHIC OBJECTIVE.
(Application filed July 2, 1898.)
(No Model.)
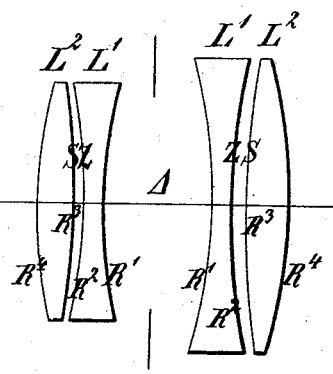
Witnesses:
Inventors:
Carl Paul Goerz
Emil Von Höegh
By Richards
their Attorneys

UNITED STATES PATENT OFFICE.

CARL PAUL GOERZ AND EMIL VON HÖEGH, OF FRIEDENAU, GERMANY.

PHOTOGRAPHIC OBJECTIVE.

SPECIFICATION forming part of Letters Patent No. 635,472, dated October 24, 1899.

Application filed July 2, 1898. Serial No. 685,045. (No model.)

*To all whom it may concern:*

Be it known that we, CARL PAUL GOERZ and EMIL VON HÖEGH, citizens of the Kingdom of Prussia, and residents of Friedenau, near Berlin, in the Kingdom of Prussia and German Empire, have invented certain new and useful Improvements in Photographic Objectives, of which the following is a specification.

Our invention relates to a double objective for photographic purposes, as shown in the accompanying drawing. This objective consists of a pair of two-lens systems arranged in a peculiar way described hereinafter for the purpose of attaining the following advantages: It is a well-known fact that the astigmatic flattening, and at the same time the neutralization, of the spherical aberration in a system of three lenses is attained by two spherical contact-surfaces of two succeeding mediums. One of them acts as a collector and the other as a disperser for the luminous rays. Proceeding from the consideration that the efficiency of an objective of this kind depends on the value of the difference of refractive indexes between the two media in juxtaposition we concluded that further improvements, and especially a considerable increase in the sharpness of the picture, would be obtained by replacing the contact-surfaces between two different glasses by such between glass and air. By this arrangement the difference between the refractive indices will be increased six or seven times. Researches in this line led us to the construction which, in spite of its simplicity, eliminates in a very high degree all defects of the image produced—*i. e.*, spherical and chromatic aberration, astigmatism, convexity of the image, coma, and distortion. In addition to this, however, we have succeeded in considerably increasing the general sharpness of the picture by diminishing the so-called "intermediate error," as compared with the astigmatically-corrected cemented three-lens systems hitherto used for the same purpose.

Each of the two-lens systems represented in the annexed drawing consists of a biconcave lens $L'$ of low-refractive index and of a biconvex lens $L^2$ of a high-refractive index, as shown.

The present system is the final result of very careful scientific researches on the following plan: Equations were established for the elimination of the spherical aberration and for producing a constant proportion of the sines for axial rays. Different values were introduced for the focal length of the first negative lens and for the distance of the two lenses from one another. The solution of the resulting equation of the fourth degree had as a product the respectively focal lengths of the second lenses and the forms for both lenses most apt for doing away with the two errors. Subsequently all these forms were controlled by trigonometrically calculating a ray near the circumference, taking into account the suitably-selected thickness of glass. This calculation showed that the calculation of the correct thickness of the glasses, which was originally left out of account, only slightly influenced the results necessary for the realization of both conditions. Each of the combinations of lenses thus obtained was then examined for curvature of the image and astigmatism by prosecuting mathematically a principal ray intersecting the axis of the system under an angle of thirty-two degrees. The astigmatic points of the image were then calculated. The comparison of the relative situation of these points and of the plane of the image hinted at the way in which the problem was to be solved. All the systems studied in this manner showed a considerable curvature of both astigmatic curves of the image. The conditions were the most favorable ones in that system in which the focal length of the first lens was smallest. Nevertheless it would be necessary for a complete removal of this error to shorten the focal length still further. The result would have been a considerable decrease in illuminating power in consequence of the great curvature of each lens. It was therefore decided not to insist on the strict fulfilment of the sine conditions in the separate lens systems and only bring the two astigmatic points of the image in the imaginary plane of the image to a coincidence, the spherical aberration in the axis being each time removed by trigonometric testing. This was carried out in the following way: From the objectives calculated in the manner previously described we selected one the curvature of whose lenses still admitted of a suitable aperture. By varying the constant values (radius of curvature, thickness of the glass, and distance of the lenses) we tried to approach our aim. This experiment succeeded completely, although the departure from the strict fulfilment of the sine combination was finally somewhat considerable. Having found a kind of glass which approximately possessed the calculated amount of refraction and of dispersing power for the spectrum and having made the corrections necessary on account of the small differences between the refractive indices of the lenses obtained and the values taken into calculation, the testing of the experimental objective in an apparatus specially constructed to that purpose showed that in the single system the want of sufficient consideration of the sine condition could not quite be recognized with precise nicety. On the other hand, the advantages of the new system appear clearly when two single systems are exactly centrally united to form a double objective. This new double objective is found to possess the same excellent and astigmatic picture - plane as the best double anastigmatic lenses hitherto known, and this, moreover, for a still larger opening. This is explained by the compact construction of the composite system and the thinness of the lenses employed. Moreover, the considerably-increased sharpness of the image of fine-line objects is remarkable both in the direction of the axis and in that of main rays intersecting it at any angle. The constructional elements of a double objective of this kind are as follows:

| Radius of curvature of the surface. | Length, in millimeters. | |
|---|---|---|
| $R'$ | 71.973 | $d' = 2.246$ millimeters, (thickness of the lens $L'$.) |
| $R^2$ | 88.944 | $d^2 = 1.813$ millimeters, (thickness of the layer of air between the lenses.) |
| $R^3$ | 130.924 | $d^3 = 4.934$ millimeters, (thickness of lens $L^2$.) |
| $R^4$ | 59.309 | |

The air-space between the two lenses ($\triangle$) is 12.043 millimeters thick. The glass employed has the following optical properties:

Refractive index for line D of the spectrum in lens $L' = 1.5356$.

Refractive index for line D of the spectrum in lens $L^2 = 1.6112$.

The relative dispersion—i. e., the refractive index of the line D of the spectrum diminished by 1, divided by the difference of the indices of the lines C and F of the spectrum $$v \frac{n_D - 1}{n_C - n_F}$$

is equal to 50.8 for lens $L'$ and to 58.6 for the lens $L^2$.

Dispersion of the glass forming the negative lens $L'$, $n\,g' - n_D = 0.01333$.
Dispersion of the glass forming the negative lens $L^2$, $n\,g' - n_D = 0.01325$.

Corresponding to the three-lens system this two-lens system contains two contact-surfaces Z and S, which disperse the light and concentrate it, respectively; but these are not contact-surfaces between glass and glass, but between glass and air. It is obvious that for a given aperture of a lens system the distinctness of the image after correction of the spherical aberration for the peripherical ray increases with the increase of the difference between the refractive indices at the contact-surfaces. The smaller these differences the deeper is the curvature of said surfaces and the more increase the intermediate errors—that is to say, the spherical deviation of the rays which pass between the center and the periphery. These differences of refractive indices consequently in the three-lens system amount to: On the surface Z, 0.06; on the surface S, 0.10. In the case of the two-lens system, on the contrary, on the surface Z, 0.53; on the surface S, 0.61, consequently nine or six times more, respectively, and therefore the surfaces themselves will possess a considerable flattening as compared with those of the three-lens anastigmatics. The very considerably increased clearness of the image is fully explained by this circumstance. The new two-lens system can therefore be regarded as a system derived from the three-lens system by decreasing the power of refraction of the inclosed lens until it becomes equal to the refraction of the air—i. e., equal to 1— and that it is no longer a glass lens, but an air-lens inclosed between a biconcave lens and a biconvex lens. The condition *sine qua non* for getting to the above-stated object— spherical, astigmatic, and chromatic corrections with increase in the clearness of the image—is formed by the following criteria. The back surface of the first biconcave lens of low-refractive power has to receive a deeper curvature than the front surface of the biconvex lens of high refraction separated from it by a layer of air. On the other hand, the first surface of the negative lens, just as in the case of the above-mentioned three-lens system, is curved flatter than the back surface of the biconvex lens. If this condition were not fulfilled, the elimination of the astigmatism, as well as of the spherical aberration, would prove impossible. The air-space left between the biconcave and the biconvex lens has the form of a convex-concave meniscus of positive focal distance. If, for instance, the achromatism of the two systems of lenses can only be approximately attained with the available species of glass, we are able to cancel the still remaining error without any difficulty by composing one of the lenses of two lenses of approximately equal refraction, but of different dispersion cemented together.

Having now particularly described and ascertained the nature of our said invention and in what manner the same is to be performed, we declare that what we claim is—

A double objective for photographic purposes consisting in two two-lens systems, each of which is composed of a biconcave lens of low-refractive power (refractive index equal to ca. 1.53) and a biconvex lens of high-refractive power (refractive index equal to ca. 1.61) both having nearly the same dispersing power and leaving between them an airspace having the form of a positive meniscus; the outside surface of the negative lens having a longer radius than the outside surface of the positive lens, substantially as shown and described.

In testimony whereof we affix our signatures in presence of two witnesses.

CARL PAUL GOERZ.
EMIL VON HÖEGH.

Witnesses:
HENRY HASPER,
C. H. DAY.